United States Patent [19]

Pirman et al.

[11] 4,159,056

[45] Jun. 26, 1979

[54] CONVEYOR MEANS FOR PACKAGING MACHINES

[75] Inventors: George H. Pirman, Brighton; Gregory J. Dwyer, Livonia; Barry C. Owen, Southfield; Ivan L. Kauffman, Commerce Township, Oakland County, all of Mich.

[73] Assignee: Ex-Cell-O Corporation, Troy, Mich.

[21] Appl. No.: 731,173

[22] Filed: Apr. 12, 1977

[51] Int. Cl.² .................................. B65G 19/00
[52] U.S. Cl. .................................. 198/726; 198/626; 53/565; 141/177
[58] Field of Search ............. 198/339, 626, 627, 726, 198/735, 836, 860, 861, 719; 53/183, 186, 564, 565; 141/177

[56] References Cited

U.S. PATENT DOCUMENTS

| | | | |
|---|---|---|---|
| 2,368,483 | 1/1945 | Monroe | 198/726 |
| 2,727,345 | 12/1955 | Schoppee | 198/626 |
| 3,108,682 | 10/1963 | Zipper | 198/626 |
| 3,619,979 | 11/1971 | Martensson et al. | 53/186 |
| 3,699,743 | 10/1972 | King et al. | 53/186 |

FOREIGN PATENT DOCUMENTS

1251124 12/1960 France ........................ 198/719

*Primary Examiner*—Joseph E. Valenza

[57] ABSTRACT

A carton conveyor means for receiving cartons directly from a carton erecting and forming machine, and conveying the cartons along a linear path through a series of work stations for filling and sealing the cartons. The conveyor includes a pair of roller chains. Each of the roller chains has attached thereto a plurality of spaced apart metal lug carrier clips which are detachably mounted on the chain. A non-metallic conveyor lug is assembled to each of the lug carrier clips in a snap-in-fashion. The conveyor lugs function to transport the cartons along a pair of carton support rails. The conveyor lugs also function as guide means and bearing means for supporting the conveyor chains.

7 Claims, 14 Drawing Figures

CONVEYOR MEANS FOR PACKAGING MACHINES

BACKGROUND OF THE INVENTION

1. Field of the Invention

This invention relates to the packaging machine art, and more particularly, to a novel and improved carbon conveyor means for packaging machines. The invention is specifically concerned with carton conveyors for packaging machines incorporating a horizontal turret on which cartons are erected and formed, and for conveying such erected and formed cartons along a linear path through various work stations to accomplish filling and sealing of the cartons.

2. Description of the Prior Art

It is well known in the packaging machine art to employ conveyor means for conveying cartons along linear paths through various work stations for filling and sealing operations. The aforementioned prior art carton conveyors have employed extended pitch chains. A disadvantage of the extended pitch conveyor chains is that they have a jerky motion as they go around the drive and idler sprockets, which provides an inconsistent and non-uniform conveyor motion, and in some cases causing jams and cartons to be damaged during filling and sealing operations. Another disadvantage of the prior art carton conveyor chains for packaging machines is that they employ various type lugs and clips which are subject to bending and twisting which results in accidents in carton filling and sealing operations.

The prior art carton conveyor chains are also costly, require many special pieces and parts, do not have a good guidance system, and repairs to such chains are difficult. A further disadvantage of the aforementioned prior art carton conveyor chains is that it is not possible to strip, or move, a carton from a carton erecting and filling mechanism directly into the prior art conveyor chains. A still further disadvantage of the prior art conveyor chains is that in many cases three chains must be employed, and a special loading mechanism of some sort must be employed for transferring the cartons from a carton erecting and forming mechanism onto the prior art chain conveyors. The aforementioned prior art type conveyor chains are also dirt catchers due to their complex construction.

SUMMARY OF THE INVENTION

In accordance with the present invention, the carton conveyor means comprises a roller type chain which is simple and compact in construction, and economical to manufacture. The carton conveyor means of the present invention may be used in carton packaging machines which employ a horizontal turret for erecting and forming cartons, because a formed carton can be stripped from a carton forming mandrel on said turret and moved directly into the carton conveyor without the need for any special transfer mechanism. The carton conveyor employs carton support rails and a pair of endless roller chains which carry a plurality of evenly spaced apart carrier clips which have removably mounted thereon a non-metallic conveyor lug that serves as a carton guide, and a bearing means for the conveyor chain. The conveyor lugs are assembled to the carrier clips in a snap-in fashion, without the need for any extra fasteners. The conveyor lugs are provided with chamfered upper edges for guiding a carton in between a pair of the lugs carried on each of the pair of roller chains forming the conveyor means.

The conveyor lugs may be constructed and arranged to provide either one or two bearing surfaces for coaction with a conveyor chain guide plate means. The conveyor means of the present invention permits a carton to be pulled upward or removed vertically from the conveyor for a filling operation, and for a subsequent pulling back or moving back of the carton into the conveyor chain.

The carton conveyor means of the present invention employs chain guide plates which may be disposed so as to provide clearances at the entrance end of the conveyor and at other stations, as for example, the filling station where it is desired to remove a carton therefrom for filling purposes and then reinserting it into the conveyor. The conveyor chains and conveyor lugs employed in the invention hold the cartons in such a manner as to provide good support for the cartons while yet allowing the carton to bulge slightly to assist in filling operations. The chain guide plates or rails function with the conveyor chains and conveyor lugs to maintain the cartons in a square position so as to keep the top square, and permit the carton to be provided with a good square top seal at the appropriate top seal station. The construction and arrangement of the carton conveyor means of the present invention provides a conveyor means which is smooth running and inherently clean, and this is an advantage since it can be washed off readily without trapping fluid or dirt The conveyor lugs are made from a suitable plastic, which is inherently lubricated by liquids such as water and milk, and they can be easily replaced when necessary.

Other features and advantages of this invention will be apparent from the following detailed description, appended claims, and the accompanying drawings.

DESCRIPTION OF THE PREFERRED EMBODIMENTS

Figure 1:
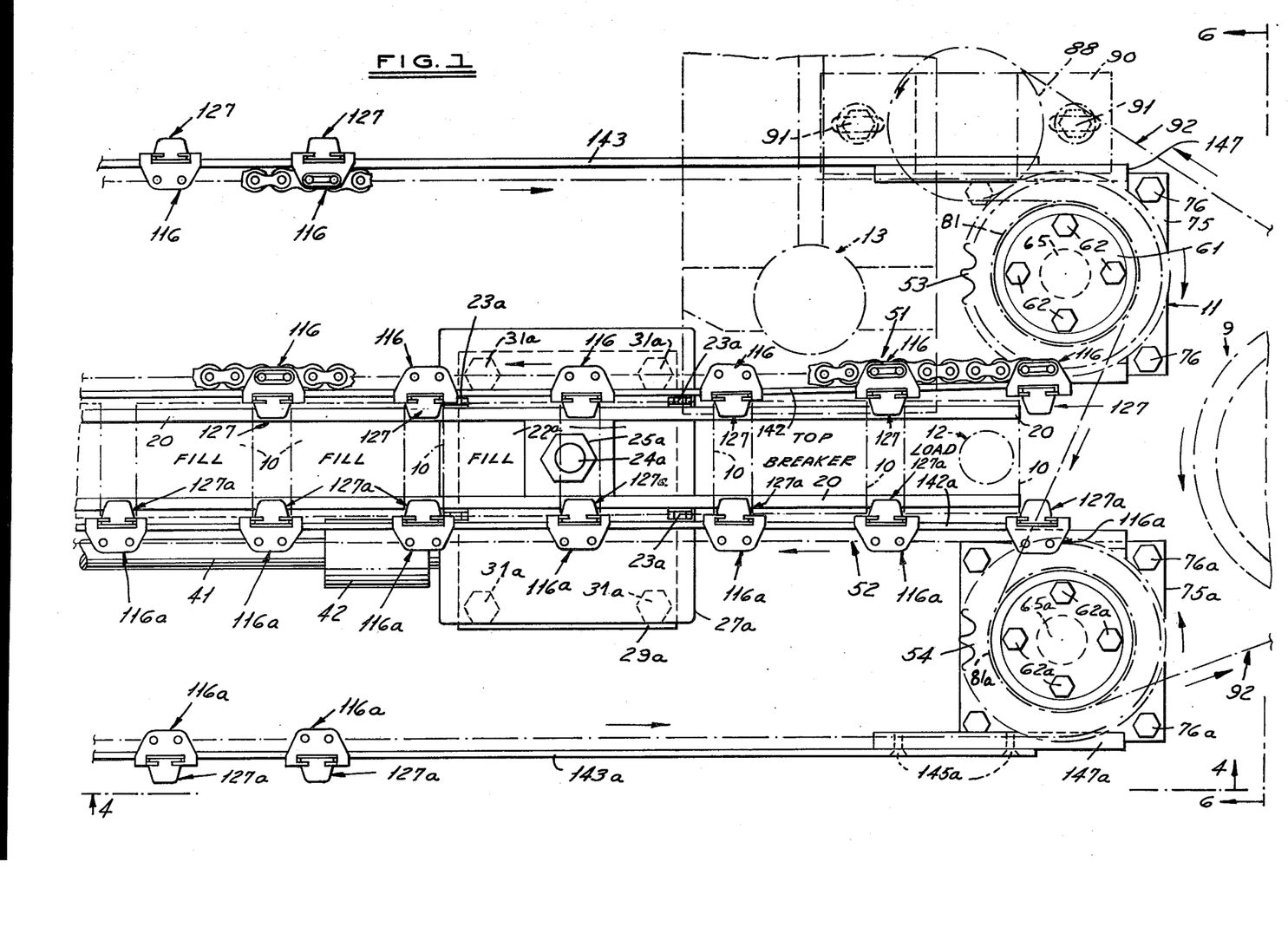
FIG. 1 is a fragmentary, top plan view, with parts removed, of the front end portion of a carton conveyor means for packaging machines, made in accordance with the principles of the present invention.
Figure 2:
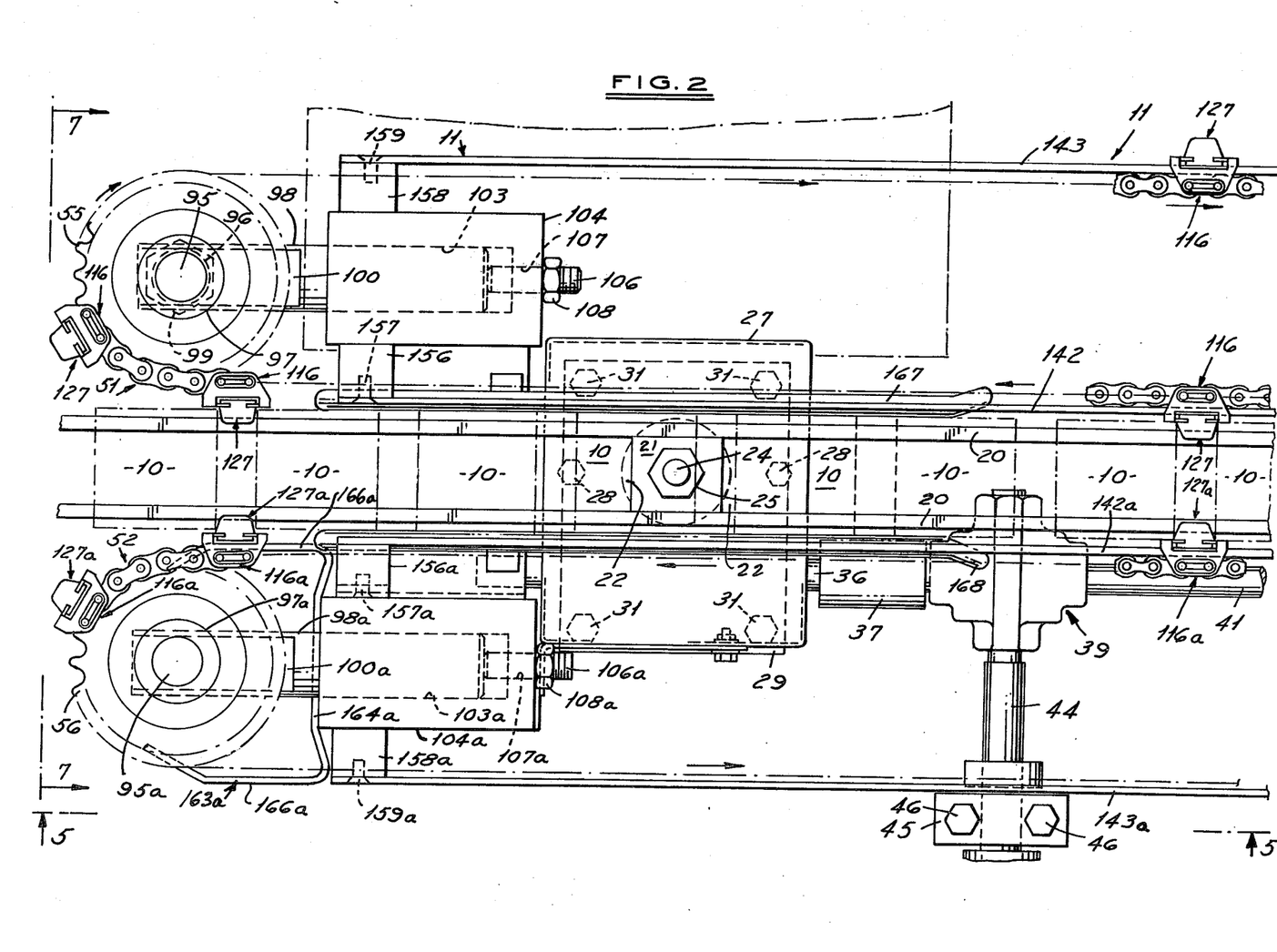
FIG. 2 is a fragmentary, top plan view, with parts removed, of the rear end portion of the carton conveyor means illustrated in FIG. 1.
Figure 3:
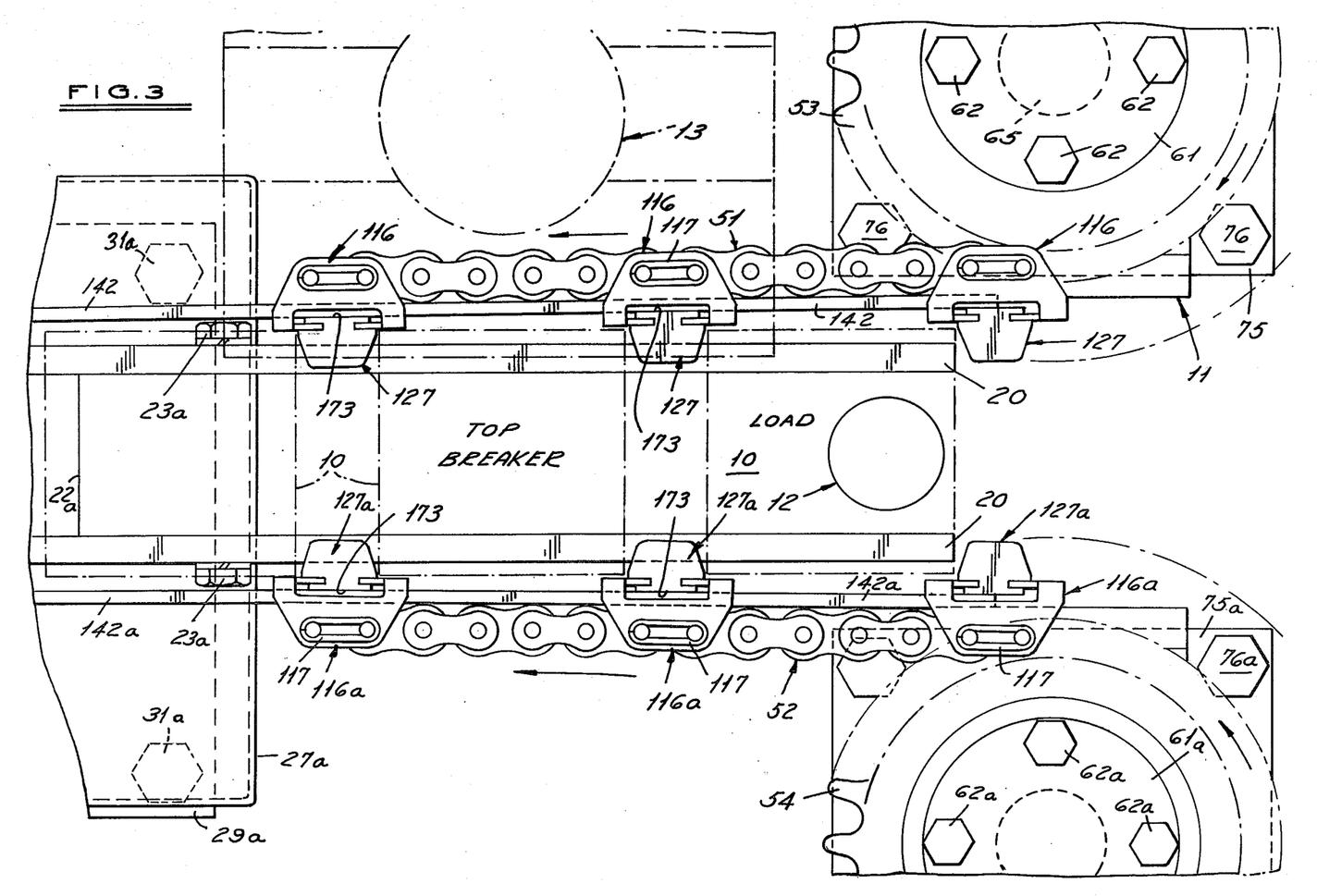
FIG. 3 is an enlarged, fragmentary, top plan view, with parts removed, of the carton conveyor front end portion structure illustrated in FIG. 1, and drawn to a larger scale.
Figure 4:
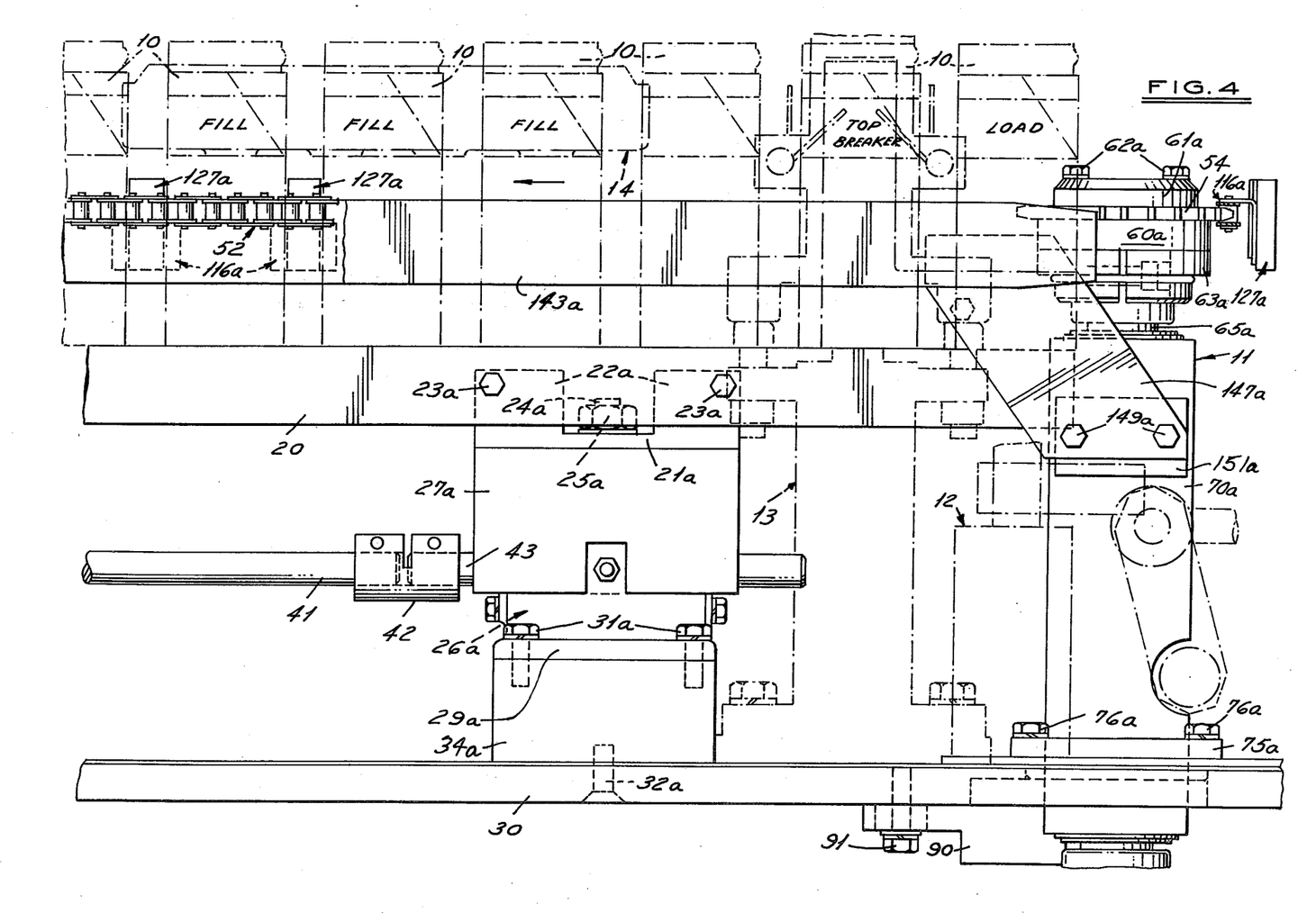
FIG. 4 is a fragmentary, side elevation view of the carton conveyor structure illustrated in FIG. 1, taken along the line 4—4 thereof, and looking in the direction of the arrows.
Figure 5:
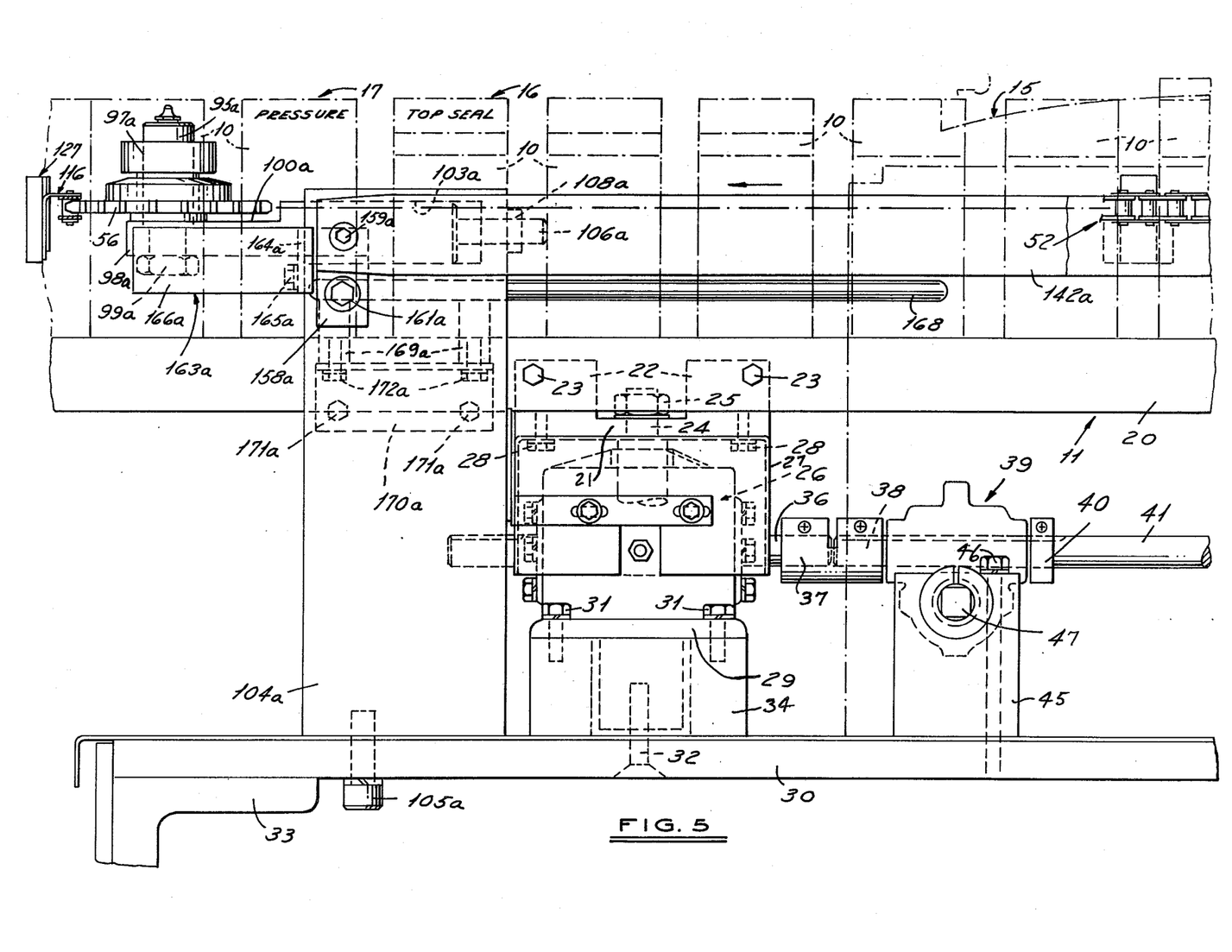
FIG. 5 is a fragmentary, side elevation view of the carton conveyor structure illustrated in FIG. 2, taken along the line 5—5 thereof, and looking in the direction of the arrows.

Referring now to the drawings, and in particular to FIGS. 1–5, the numeral 11 generally designates a carton conveyor means made in accordance with the principles of the present invention, and which is adapted to convey conventional coated paperboard cartons, indicated by the numeral 10, from a carton erected and forming mechanism along a linear path through a series of work stations for filling and sealing the cartons. FIG. 1 is a fragmentary top plan view of the front end portion of the conveyor means. FIG. 2 is a fragmentary top plan view of the rear end portion of the conveyor means. FIG. 4 is a fragmentary side elevation view of the front end portion of the conveyor means. FIG. 5 is a fragmentary side elevation view of the rear end portion of the conveyor means. The numeral 9 in FIG. 1 generally designates the main indexing turret of a packaging machine, and as it indexes, it drives the chains of the carton conveyor of the present invention, as described in detail hereinafter.

Figure 6:
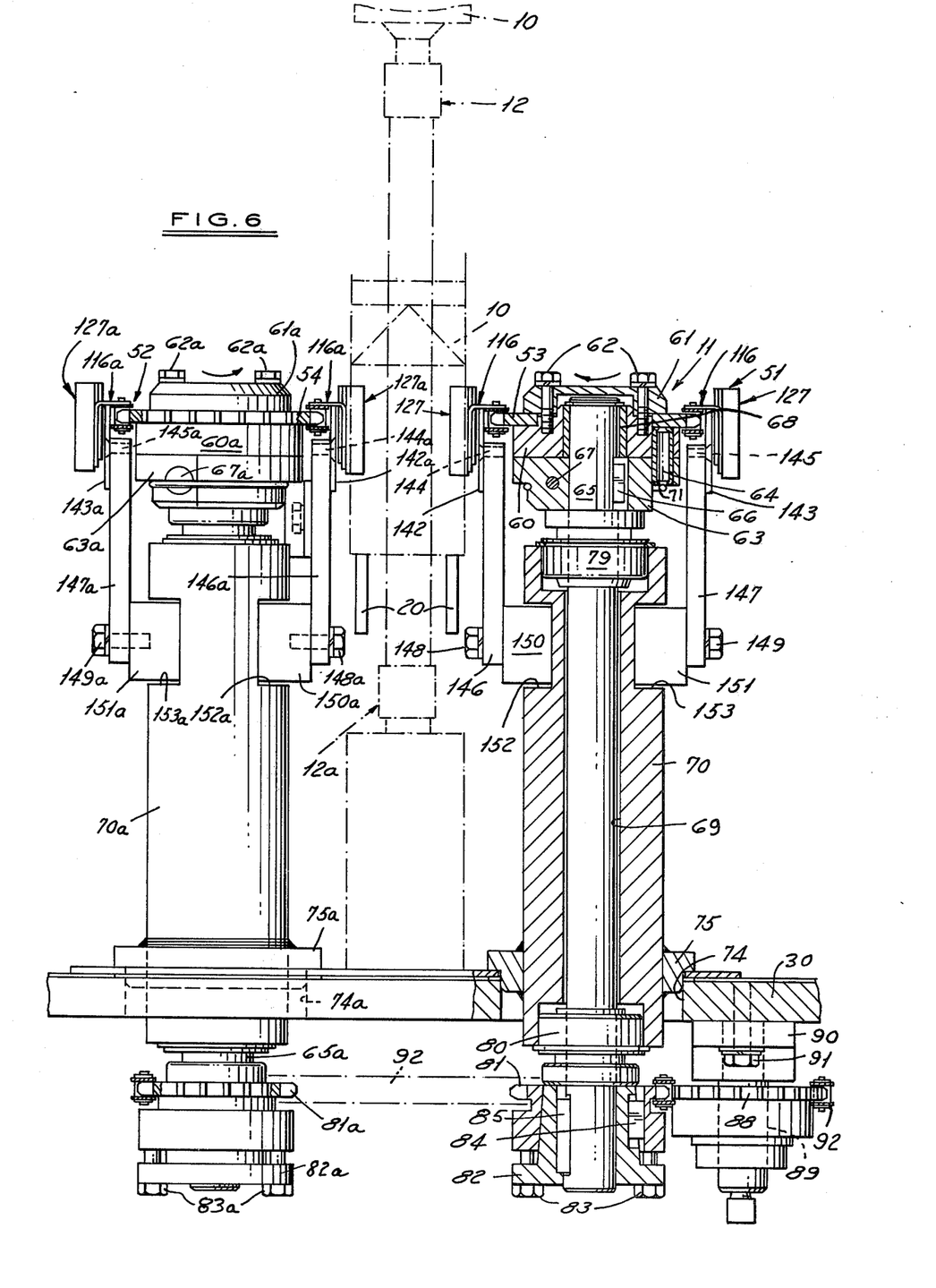
FIG. 6 is a fragmentary, front end elevation view of the carton conveyor structure illustrated in FIG. 1, showing the entrance end of the conveyor, taken along the line 6—6 of FIG. 1, and looking in the direction of the arrows.

As shown in FIGS. 1, 4 and 6, the numeral 12 generally illustrates a conventional carton stripper means for stripping cartons 10 from a conventional horizontal turret on which the cartons are erected and formed. The stripper means 12 engages the bottom end of a carton 10, as illustrated in FIG. 6, and strips or moves it directly downwardly into a square position on the conveyor means of the present invention at the station marked "load" in FIG. 1. The numeral 13 in FIGS. 1 and 4 generally illustrates a conventional carton top breaker apparatus for performing a top breaking operation on a carton at the station marker "top breaker" in FIG. 1. The conveyor moves the cartons 10 from the top breaker station along a linear path and through a fill operation by a conventional carton filler means generally illustrated by the numeral 14 in FIG. 4.

As illustrated in FIG. 5, the conveyor means moves the cartons 10 from the fill station through a conventional carton closing means, generally indicated by the numeral 15, and thence to a top seal station for an operation by a conventional sonic top heat and seal means, generally illustrated by the numeral 16. The cartons 10 are then moved through a pressure station, generally indicated by the numeral 17, from whence they are moved off of the conveyor and into another conventional machine for further processing.

Figure 7:
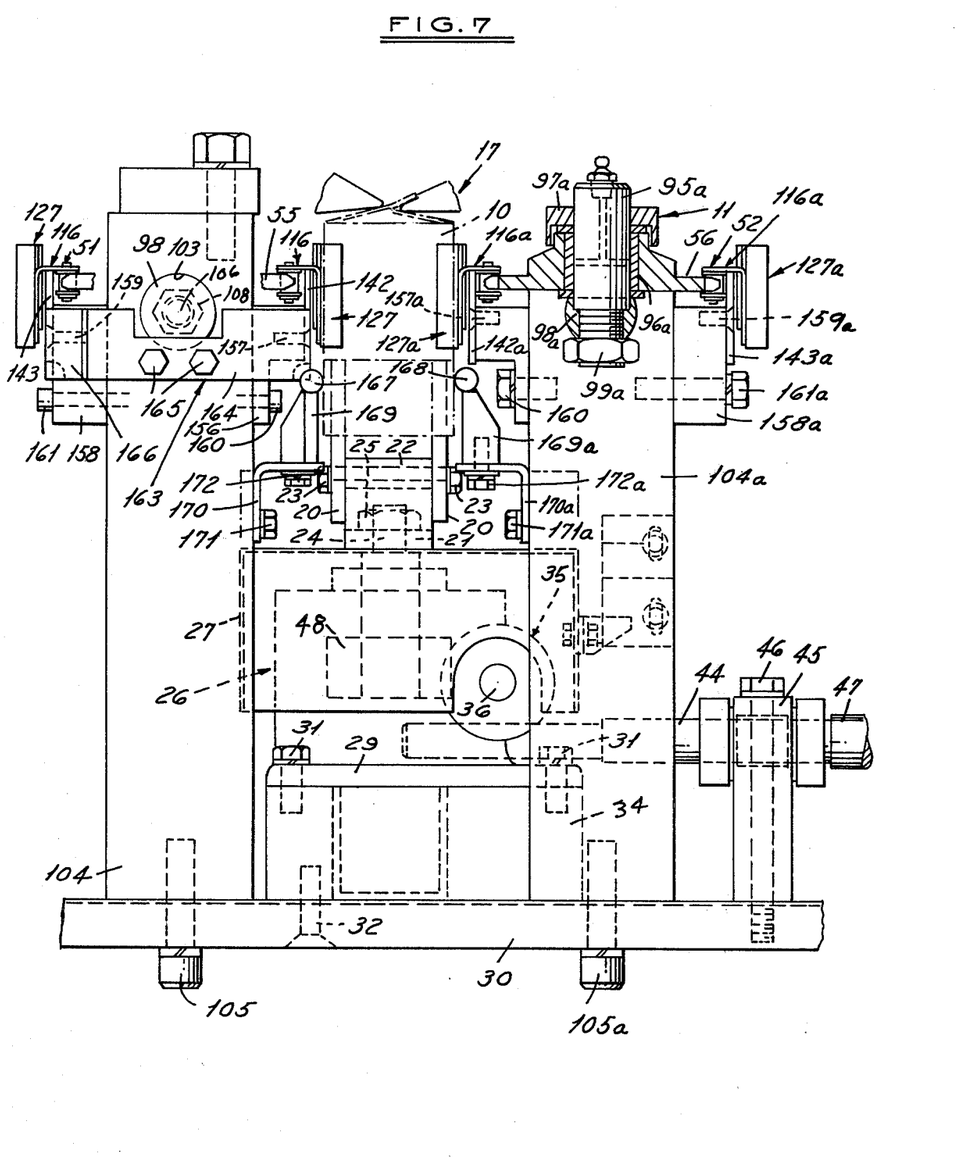
FIG. 7 is a fragmentary, rear end elevation view of the carton conveyor structure illustrated in FIG. 2, taken along the line 7—7 thereof, looking in the direction of the arrows, and showing the discharge end of the conveyor.

As shown in FIGS. 1 through 4, the carton conveyor means of the present invention includes a pair of vertically disposed, laterally spaced apart carton support rails 20, which are supported by a suitable elevating means as described hereinafter. As shown in FIGS. 2, 5 and 7, the rear end of the carton support rails 20 are secured by suitable machine screws 23 to a V-shaped mounting block having a pair of raised end portions 22 which are disposed between the support rails 20. The mounting block includes an integral central portion 21 which is secured to the top end of a lifting means shaft 24 of a carton support rail lift means generally indicated by the numeral 26, by a suitable lock nut 25. The numeral 27 designates a suitable cover for the support rail lift means 26, and it is secured to the underside of the last mentioned mounting block by suitable machine screws 28.

As best seen in FIG. 5, the carton support rail lift means 26 includes a mounting plate or flange 29 which is fixed by suitable machine screws 31 to a base member 34. The base member 34 is seated on the conveyor machine base plate 30, and it is fixed thereto by any suitable means, as by suitable machine screws 32. The conveyor base plate 30 is provided with suitable ground support legs 33. As shown in FIG. 5, the front end of the carton support rails 20 is also supported by a carton support rail lift means structure 26a. The parts of the lift means 26a which are the same as the parts of the first described lift means 26 are indicated by the same numerals, followed by the small letter "a". Any suitable lift means may be employed, as for example, one available on the market and known as a Simplex Uni-Lift Worm Gear Actuator Lift Means, Model J-2. The lift means 26 and 26a provide a vertical adjustment for the support rails 20 to accommodate cartons of different capacities. In one embodiment the lift means 26 and 26a provided a 2" lift differential.

As shown in FIGS. 2 and 5, the carton rail lift means 26 and 26a are operated by a common hand crank shaft 47 which is rotatably supported by a suitable bearing block 45. The bearing block 45 is secured to the conveyor base plate 30 by any suitable means, as by suitable machine screws 46. The hand crank shaft 47 has an inwardly extended portion 44 which has a worm gear formed on the inner end thereof that meshably engages with a suitable gear in a right angle gear drive means, generally indicated by the numeral 39. Any suitable right angle gear drive means may be employed, as for example one available on the market and known as a Tol-O-Matic Float-A-Shaft, series No. 0110.

The right angle gear drive means 39 drives a longitudinal shaft which has one end 38 extended outward toward the lift means 26, as shown in FIG. 5. As shown in FIG. 5, the lift means 26 has an input shaft 36 which is connected by a shaft coupling 37 to the right angle gear drive shaft 38. As illustrated in FIG. 7, the lift means input shaft 36 carries a suitable worm gear 35 which is meshably engaged by a gear 48 mounted on the lower end of the shaft 24. The numeral 40 in FIG. 5 designates a shaft collar which is operatively mounted on the shaft 41 which extends out of the other end of the right angle gear drive 39, and which is operatively connected to the second support rail lift means 26a. As shown in FIG. 4, the gear shaft 41 is connected by a suitable shaft coupling 42 to the input shaft 43 of the second lift means 26a. It will be seen, that by turning the hand crank shaft 47 in the appropriate direction, the carton support rails 20 may be raised and lowered, as desired.

As shown in FIGS. 1 and 2, the carton conveyor means of the present invention includes a pair of horizontally disposed, endless roller chains, generally designated by the numerals 51 and 52, and which function as carton carrier means. As shown in FIG. 1, the conveyor chains 51 and 52 are mounted around and driven, at the front end of the conveyor, by a pair of plate sprockets 53 and 54, respectively. The mounting structure for the sprocket 53 will be described, and the corresponding mounting structure for the sprocket 54 will be marked with the same reference numerals followed by the small letter "a". As shown in FIG. 2, the conveyor chains 51 and 52 are mounted around a pair of idler sprockets 55 and 56, respectively, at the rear end of the conveyor means. The structure for mounting the idler sprocket 55 will be described in detail and the corresponding structure for mounting the idler sprocket 56 will be marked by the same reference numerals followed by the small letter "a".

As shown in FIG. 6, the drive plate sprocket 53 is fixedly secured to a sprocket hub driven ring 60 by a cup cover 61 and a plurality of suitable machine screws 62. The sprocket hub driven ring 60 is seated on top of a sprocket hub drive ring 63, and it is drivably connected thereto by a suitable shear pin 64 which is mounted vertically in a pair of aligned bores formed in the driven ring 60 and the drive ring 63. The shear pin 64 is held in position by a suitable retainer ring 71. The sprocket hub driven ring 60 is rotatably mounted on the upper end of a vertical drive shaft 65 by a suitable sleeve bearing means 68. The sprocket hub drive ring 63 is fixedly secured to the drive shaft 65 by a suitable key 66 and a dowel pin 67. The drive shaft 65 is vertically disposed and extends downwardly through a bore 69 in a vertical drive sprocket support post 70. The drive shaft 65 is rotatably mounted in the vertical support post 70 by a pair of suitable upper and lower bearing means 79 and 80, respectively.

As shown in FIG. 6, the lower end of the vertical support post 70 is fixedly secured, as by welding, to a mounting plate 75 which has a reduced diameter portion on the lower side thereof which is seated in an opening 74 formed through the conveyor base plate 30. As shown in FIG. 1, the mounting plate 75 is secured to the base plate 30, by suitable machine screws 76.

A sprocket 81 is operatively mounted on the lower end of the drive shaft 65 by the following described structure. As shown in FIG. 6, the sprocket 81 is operatively mounted on a cone shaped carrier hub 82, and it is secured thereto by suitable machine screws 83. The sprocket 81 is also secured to the hub 82 by a suitable key 84. The hub 82 is secured to the lower end of the drive shaft 65 by a suitable key 85.

As shown in FIG. 1, the drive sprockets 81 and 81a, are driven by an endless drive chain, generally indicated by the numeral 92. The drive chain 92 is operatively connected to the drive means of the main or indexing turret 9 of the main packaging machine, and it is driven, as shown by the arrows alongside the chain 92 in FIG. 1, in a direction so as to turn the drive sprocket 53 in a clockwise direction and the drive sprocket 54 in a counterclockwise direction, as shown in the top view of FIG. 1. The drive chain 92 is driven by the main turret 9 and is driven around an idler sprocket 88 that may be adjusted for taking up the slack in the chain 92. As shown in FIG. 6, the idler sprocket 88 is rotatably mounted on a vertical shaft 89 that is fixedly secured to a horizontal mounting plate 90. As shown in FIG. 1, the mounting plate 90 is adjustably secured to the conveyor base plate 30 by a pair of suitable machine screws 91.

The drive chain 92 passes around the idler sprocket 88 and thence around the drive sprocket 81 and the drive sprocket 81a, and back to the drive sprocket for the main turret 9.

As shown in FIG. 2, the idler sprocket 55 is operatively mounted on a vertically disposed idler sprocket shaft 95 by a suitable sleeve bearing and thrust washer means 96. A suitable dirt cap 97 encloses the last mentioned bearing means 96. The lower end of the idler sprocket shaft 95 is threaded and it is seated in a suitable bore formed in the outer end of a horizontal mounting post 98. The sprocket shaft 95 is secured to the mounting post 98 by a suitable jam nut 99. As shown in FIGS. 2 and 5, the mounting posts 98 and 98a are provided with a flat surface 100 for clearance of the idler sprocket 55.

As shown in FIG. 2, the inner end of the mounting post 98 is slidably mounted in a horizontal bore 103 formed in the rear face of an idler sprocket support vertical post 104. As shown in FIG. 7, the vertical support post 104 is fixedly secured by suitable machine screws 105 to the conveyor base plate 30. The rear end of the bore 103 is enclosed. A set screw 106 is threadably mounted through a threaded bore 107 formed through the support post 104 and it extends into the bore 103 and into engagement with the rear end of the mounting post 98. It will be seen that the set screw 106 may be adjusted inwardly or outwardly to move the mounting post 98, for adjusting the tension on the conveyor chain 51, as desired. The set screw 106 is locked in a desired adjusted position by a jam nut 108. FIGS. 2, 5 and 7 show the corresponding mounting structure for the idler sprocket 56.

Figure 8:
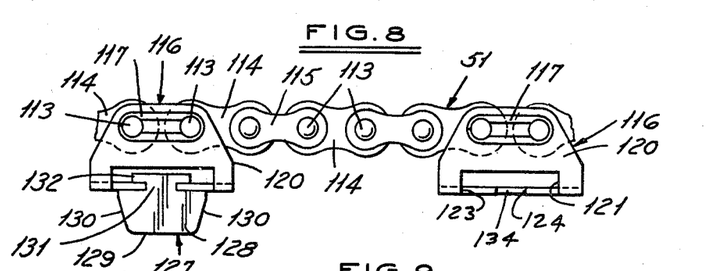
FIG. 8 is a fragmentary, top plan view of a part of the conveyor roller chain, a conveyor lug, and lug carrier employed in the invention.
Figure 9:
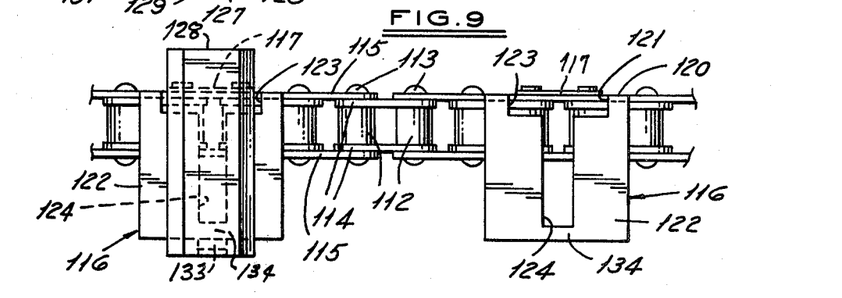
FIG. 9 is a front elevation view of the conveyor chain structure illustrated in FIG. 8.

FIGS. 8 and 9 illustrate the construction of the conveyor roller chain 51, and it will be understood that the conveyor roller chain 52 is similarly constructed. As shown in FIGS. 8 and 9, the roller chain 51 is a standard commercial roller chain which includes a plurality of chain rollers 112 which carries roller pins 113 at each end thereof. The rollers 112 are connected together by standard roller chain connecting links 114 and 115. At predetermined, spaced apart positions along the length of the chain 51, a connecting link 115 is removed and replaced by an L-shaped lug carrier clip, generally indicated by the numeral 116, and made in accordance with the principles of the present invention.

The L-shaped lug carrier clip 116 includes a horizontal plate portion 120, which has two spaced holes for the reception of the upper ends of a pair of adjacent roller pins 113. The lug clip plate portion 120 is secured to the roller chain 51 by a releasable spring clip 117 which comprises a standard chain repair link.

The horizontal plate portion 120 of the L-shaped carrier clip 116 is provided with a central, transverse opening 121 along the front end thereof. As shown in FIGS. 8 and 9, the L-shaped lug carrier clip 116 includes an integral front vertical plate portion 122 which is provided with a transverse slot 123 along the upper end thereof that communicates with the opening 121 in the plate portion 120. The front vertical plate portion 122 of the lug carrier 116 also is provided with a vertically disposed, longitudinally extended rectangular slot 124 which extends downwardly from the transverse slot 123, to provide a T-shaped slot in the plate portion 122. The numeral 134 in FIG. 9 designates the portion of the front plate 122 which is beneath the vertical slot 124.

Each of the lug carrier clips 116 has releasably mounted thereon a snap-in carton carrier lug, generally designated by the numeral 127. The numeral 128 designates the upper end surface of the lug 127. As shown in FIG. 8, each of the lugs 127 has a flat front face 129 which extends longitudinally of the lug, and which is perpendicular to the top surface 128. The front surface 129 of each of the carrier lugs 127 is also parallel to the front plate portion 122 of the carrier clips 116. As shown in FIGS. 8 and 9, each of the carrier lugs 127 is provided with inwardly converging longitudinal side surfaces 130 which converge forwardly toward the front surface 129, so as to provide angular side guide surfaces for cartons 10 being inserted between four coacting lugs 127.

Figures 10, 11:
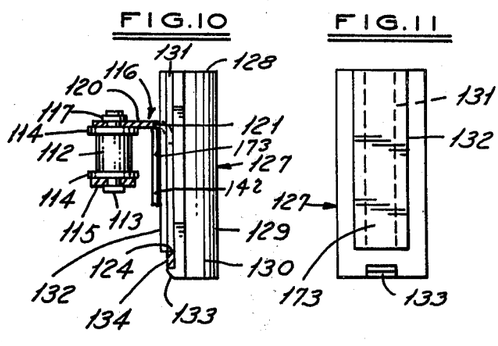
FIG. 10 is a side elevation view of a conveyor lug and lug carrier, and showing the lug carrier attached to a conveyor chain link.
FIG. 11 is a rear elevation view of the conveyor lug illustrated in FIGS. 8, 9 and 10.

As shown in FIGS. 8, 10 and 11, each of the carrier lugs 127 is provided with a T-shaped attachment member for attaching each of the lugs to one of the carrier clips 116. Each of the attachment means includes an integral and rearwardly extended and longitudinally disposed leg 131 which has integrally formed on the outer end thereof a transverse plate 132 so as to form a T-shaped attachment structure. As best seen in FIG. 11, a retainer lip 133 is integrally formed on the rear face 173 of each of the carrier lugs 127 in a position spaced downwardly from the lower end of the last mentioned T-shaped attachment means. The carrier lugs 127 are made from a suitable plastic material, such as a nylon plastic material. Each of the carrier lugs 127 is operatively mounted on an adjacent L-shaped lug carrier clip 116 by inserting the lower end of the attachment plate structures 131 and 132 into the openings 121 and 123 and moving the lug downwardly in the slot 124 until the retainer lip 133 is snapped into position, as shown in FIGS. 10, under the portion 134 of the carrier clip front plate 122.

Figure 12:
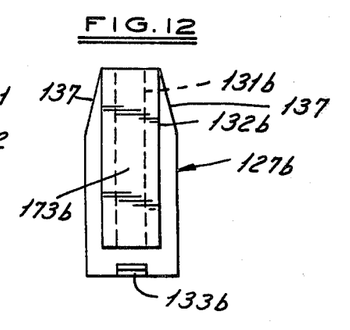
FIG. 12 is a rear elevation view of a modified conveyor lug employed in the invention.

FIG. 12 illustrates a modified lug carrier embodiment and the parts of the lug shown in FIG. 12 which are the same as the lugs shown in FIGS. 8 through 11 have been marked with the same reference numerals followed by the small letter "b". The only difference between the carrier lug 127b and 127 is that the carrier lug 127b is provided with tapered upper edges 137 along each of the sides thereof at the upper ends thereof. The tapered edges 137 assist in guiding a carton 10 into an operative position on the conveyor means, so that it may be properly seated and held by four of the carrier lugs in a square and good supporting position.

Figure 13:
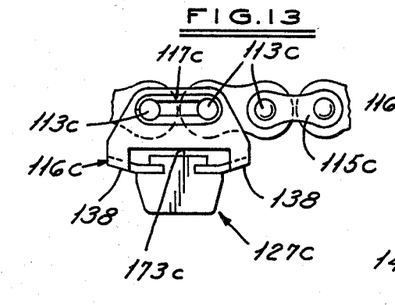
FIG. 13 is a fragmentary, top plan view of a conveyor roller chain provided with a modified conveyor lug carrier.

FIG. 13 illustrates a modified embodiment of the L-shaped lug carrier clip 116. The lug carrier clip illustrated in FIG. 13 is designated generally by the numeral 116c. The parts of the structure illustrated in FIG. 13 which are the same as the structure illustrated in FIGS. 8 through 11 have been marked with the same reference numerals followed by the small letter "c". In the embodiment of FIG. 13, the lug carrier clip 116c has been provided with backward tapered side edges 138 so as to provide clearance between a carton being inserted on the conveyor means and the lug carrier clip during a carton loading operation. The structure of FIG. 13 is advantageous where the conveyor means of the present invention is used in a machine where a pair of cartons are stripped from a carton erecting and forming machine and mounted on the conveyor means in a single motion.

Figure 14:
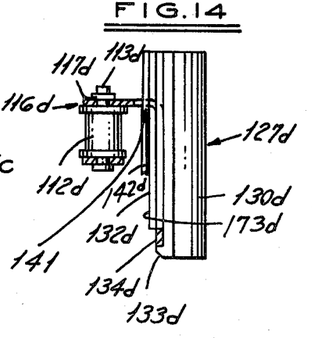
FIG. 14 is a side elevation view, similar to FIG. 10, and showing a modified conveyor lug.

FIG. 14 illustrates a further modified carrier lug 127d. The parts of the structure illustrated in FIG. 14 which are the same as the structure of the parts illustrated in FIGS. 8 through 11 have been marked with the same reference numerals followed by the small letter "d". In the embodiment of FIG. 14, the carrier lug 127d has been provided with an integral, longitudinally extended and rearwardly projecting bearing member 141 which has its lower end slidably engaged with the upper surface of a chain guide plate designated by the numeral 142d. It will be seen that the lug carrier embodiment 127d provides a carrier lug which provides for bearing of the lug on the side surface and upper end surface of a chain guide plate, as more fully described hereinafter.

As shown in FIGS. 1, 2, 3 and 6, the conveyor roller chain 51 is carried on and guided by an inner chain guide plate 142 and an outer chain guide plate 143. The conveyor chain 52 is provided with a pair of similar chain guide plates designated by the numerals 142a and 143a, respectively. As best seen in FIGS. 4 and 6, the front ends of the chain guide plates 142 are disposed adjacent the sprockets 53 and are fixed in position to the upper ends of a pair of mounting plates 146 and 147, by suitable machine screws 144 and 145, respectively. The lower ends of the mounting plates 146 and 147 are secured by suitable machine screws 148 and 149 to spacer blocks 150 and 151, respectively. The spacer block 150 is seated in a groove 152 formed on the inner side of the vertical support post 70. The spacer block 151 is seated in a groove 153 formed on the outer side of the vertical support post 70. The machine screws 148 and 149 extend through the spacer blocks 150 and 151 into engagement with the vertical support post 70. The front ends of the chain guide plates 142a and 143a are also fixedly secured in position by the same type structure as that last described for the chain guide plates 142 and 143.

As shown in FIG. 7, the rear ends of the chain guide plates 142 and 143 are secured by suitable machine screws 157 and 159 to mounting blocks 156 and 158, respectively. The mounting blocks 156 and 158 are seated on the inner and outer sides of a vertical support post 104, and they are secured to the post 104 by suitable machine screws 160 and 161, respectively.

As shown in FIGS. 2 and 7, the conveyor chains 51 and 52 are provided at the rear ends thereof, adjacent the rear ends of the last described chain guide plates with a U-shaped guide means, generally indicated by the numerals 163 and 163a, respectively. As shown in FIG. 7, the U-shaped guide means 163 comprises a central mounting plate portion 164 which is secured by machine screws 165 to the rear face of the vertical support post 104. A rearwardly extended and inwardly angled guide arm 166 is integrally attached to each end of the mounting plate portion 164 for guiding the lugs 127 and 127a around their respective idler sprockets 55 and 56, respectively.

As shown in FIGS. 2 and 7, a pair of carton guide rails 167 and 168 are mounted at the rear end of the conveyor means for providing guidance to the lower ends of the cartons 10 during the top sealing and top pressure operations. As shown in FIG. 7, the guide rail 167 is secured, as by welding, to the upper end of a pair of mounting posts 169 which are secured by suitable machine screws 172 to an angle iron 170. The angle iron 170 is secured by suitable machine screws 171 to the inner face of the vertical support post 104. As shown in FIG. 5, the guide rail 168 is secured by a similar structure to the inner side of the vertical support post 104a, and the corresponding parts thereof are marked with the same reference numerals followed by the small letter "a".

In use, the carton conveyor means of the present invention is disposed as shown in FIGS. 1 through 5 with the front end thereof in a position so that a carton stripper means may strip an erected and formed carton from a horizontal rotatable turret directly down into the "load" or first position shown in FIG. 3. As shown in FIG. 3, the leading end of the chain guide plates 142 and 142a are spaced slightly apart to allow more clearance to permit quick and efficient insertion of a carton 10 into a position between four carrier lugs 127 carried on the conveyor chains 51 and 52. The chain guide plates 142 and 142a are preferably moved in closer toward each other to provide less clearance between the carrier lugs 127 and a carton 10 so as to hold the carton 10 in a square position for a top breaking operation thereon by a conventional top breaker means. The chain guide plates 142 and 142a have been shown in an exaggerated spread apart position in FIG. 3 to illustrate the feature of adjustability of these guide plates. It will be understood that at other work stations along the line of the conveyor means, the chain guide plates 142 and 142a may again be spread apart for easy removal and insertion of a carton 10, as for example, at a fill station where it is desired to pull a carton 10 upwardly from the conveyor and fill it and then move it directly downward back into the conveyor means between a set of four of the carrier lugs 127.

It will be seen that as the conveyor chains 51 and 52 are moved along the chain guide plates 142, 142a, 143 and 143a, that the back faces 173 of the carrier lugs 127 slide on the inner faces of the guide plates, whereby the carrier lugs 127 provide guide and bearing surfaces for support of the conveyor chains. It will be also seen that the carrier lug embodiment of FIG. 14 employs a second bearing surface, which is provided by the lower end of the integral projection 141 that is adapted to be slidably seated on the upper surfaces of the conveyor chain guide plates 142, 142a, 143 and 143a.

Although the carton conveyor means of the present invention has been illustrated as being employed as a single line conveyor, it will be understood that conveyor means made in accordance with the invention may be employed, in twin lines, or other plural line arrangements, as desired.

While it will be apparent that the preferred embodiments of the invention herein disclosed are well calculated to fulfill the objects above stated, it will be appreciated that the invention is susceptible to modification, variation and change.

What is claimed is:

1. In a conveyor means for packaging machines, the combination comprising:
   (a) elongated carton support rail means,
   (b) means for adjustably supporting said carton support rail means;
   (c) a single endless carrier means disposed along each side of each carton support rail means;
   (d) guide plate means operatively mounted along said support rail means in a position spaced thereabove for guiding engagement of said endless carrier means along the outer side thereof;
   (e) a carrier clip including a first portion releasably attached to said endless carrier means and slidable on the top end of said guide plate means, and having a central transverse opening formed therein; and a second portion extended along the inner side of said guide plate means and having slot means formed therein communicating with said central transverse opening;
   (f) a carton lug including an elongated body portion and a T-shaped attachment portion formed along an inner side surface thereof, adapted to being slidably mounted in said central transverse opening and said slot means of said carrier clip; and
   (g) drive means operatively connected to said endless carrier means for moving said carton lugs along said support rail means, along the inner sides of said guide plate means, for engagement with cartons to move same through a plurality of work stations for filling and closing the cartons.

2. In a conveyor means for packaging machines the combination described in claim 1, and a retainer lip integrally formed on the rear face of said T-shaped attachment portion at the lower end thereof and adapted to snap into position below the lower edge of said second portion of said carrier clip when said carton lug is slidably mounted on said carrier clip.

3. A conveyor means for packaging machines as defined in claim 1, wherein:
   (a) each of said carton lugs is provided with a forwardly converging side face along the sides of the elongated body of the lug.

4. A conveyor means for packaging machines as defined in claim 1, wherein:
   (a) each of said carton lugs is provided with tapered upper edges on each side of the elongated body of the lug.

5. A conveyor means for packaging machines as defined in claim 1, wherein:
   (a) each of the carton lugs is attached to the second portion of a carrier clip; and
   (b) the outer sides of each portion of each carrier clip are tapered rearwardly away from the carton lug mounted thereon.

6. A conveyor means for packaging machines as defined in claim 1, wherein:
   (a) said guide plate means may be positioned for moving the carrier clip inwardly and outwardly at predetermined positions along the conveyor means for providing variable carton clearances along the conveyor means.

7. A conveyor means for packaging machines as defined in claim 1, wherein:
   (a) said drive means includes drive sprocket means and driven sprockets, and shear pin means operatively mounted in said drive sprocket means.

* * * * *